United States Patent
Bergman et al.

(10) Patent No.: US 7,551,773 B2
(45) Date of Patent: Jun. 23, 2009

(54) ENCODING IMAGE DATA USING MASK LOOKUP TABLE AND DECODING SUCH ENCODED IMAGE DATA

(75) Inventors: Ruth Bergman, Haifa (IL); Gitit Ruckenstein, Haifa (IL); Doron Shaked, Haifa (IL); Renato Keshet, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 718 days.

(21) Appl. No.: 10/912,034

(22) Filed: Aug. 5, 2004

(65) Prior Publication Data
US 2006/0028686 A1 Feb. 9, 2006

(51) Int. Cl.
*G06K 9/00* (2006.01)
(52) U.S. Cl. .................. 382/166; 358/2.1; 382/232; 382/233
(58) Field of Classification Search .............. None
See application file for complete search history.

(56) References Cited

U.S. PATENT DOCUMENTS

| | | | |
|---|---|---|---|
| 5,341,442 A | 8/1994 | Barrett et al. | |
| 5,805,226 A | 9/1998 | Jung | |
| 6,356,588 B1 | 3/2002 | Otto | |
| 6,385,337 B1 | 5/2002 | Klassen | |
| 6,538,771 B1 | 3/2003 | Sakatani et al. | |
| 6,567,559 B1 | 5/2003 | Easwar | |
| 2002/0021758 A1* | 2/2002 | Chui | 375/240.19 |

FOREIGN PATENT DOCUMENTS

EP 0525426 2/1993

OTHER PUBLICATIONS

P. Franti et al., "Compression of Digital Images by Block Truncation Coding: A Survey", 1994, The Computer Journal, vol. 37, pp. 308-332.*

Olsen, S. I., "Block Truncation and Planar Image Coding", Dec. 2000, Pattern Recognition Letters, vol. 21, pp. 1141-1148.*

Y. Wu et al., "Single Bit-Map Block Truncation Coding of Color Images," Jun. 1992, IEEE, vol. 10, pp. 952-959.*

Delp, E. J. and Mitchell, O.R. (1979) Image compression using Block Truncation Coding. IEEE Trans. Commun., vol. 27 pp. 1335-1342.

Nasiopoulos P, Ward RK, Morse DJ, "Adaptive Compression Coding," IEEE T Commun 39: (8) 1245-1254 Aug. 1991.

Yiyan Wu and David C. Coll, BTC-VQ-DCT Hybrid Coding of Digital Images, IEEE Transactions On Communications vol. 39, No. 9, Sep. 1991.

(Continued)

*Primary Examiner*—Jingge Wu
*Assistant Examiner*—John W Lee (57) ABSTRACT

In one aspect, an image is quantized by assigning sub-ranges of pixel values in the image to respective quantization levels. The quantized image is encoded based at least in part on a mask lookup table assigning index values to respective masks, wherein each mask corresponds to a respective spatial distribution of the quantization levels. In another aspect, a code corresponding to an encoded image with pixel values quantized to respective quantization levels is received. The code is decoded based at least in part on a mask lookup table assigning index values to respective masks, wherein each mask corresponds to a respective spatial distribution of the quantization levels.

45 Claims, 5 Drawing Sheets

OTHER PUBLICATIONS

P. Fränti, O. Nevalainen and T. Kaukoranta, "Compression of digital images by Block Truncation Coding: A survey", The Computer Journal, 37 (4), 308-332, 1994.

Takio Kurita et al. "A method of Block Truncation Coding for Color Image Compression," IEEE Trans ono Comm., vol. 41, No. 9, pp. 1270-1274, Sep. 1993.

Yiyan Wu et al. "Single Bit-Map Block Truncation Coding of Color Images," IEEE Journal on Selected Areas in Communications, vol. 10, No. 5, pp. 952-959, Jun. 1992.

Gonzalo R. Arce, Neal C. Gallagher Jr., "BTC Image Coding Using Median Filter Roots", IEEE Transactions on Communications, No. 6, Jun. 1983 pp. 784-793.

Olsen, S I —"Block Truncation and Planar Image Coding"— Pattern Recognition Letters vol. 21 No. 13-14—Dec. 2000—pp. 1141-1148.

\* cited by examiner

ENCODING IMAGE DATA USING MASK LOOKUP TABLE AND DECODING SUCH ENCODED IMAGE DATA

BACKGROUND

In many application environments, an image is encoded (or compressed) to reduce the total amount of data needed to represent the image. The compressed data may then be stored or transmitted more efficiently than the original uncompressed image data.

Block truncation coding (BTC) is a common image encoding technique. BTC is a simple and fast compression method and therefore is useful in printing applications. The BTC technique quantizes blocks of pixels in an image in a way that preserves the first and second moments of pixel values in the block (i.e., the mean of values and the mean of squares of values in the quantized blocks are the same as in the original blocks). In accordance with the BTC technique, a grayscale image is divided into square blocks of m pixels. The pixels of a given block with values smaller than the mean pixel value for the given block are segmented into a light pixel group and the pixels with values greater than or equal to the mean pixel value are segmented into a dark pixel group. Two quantization levels a, b are computed for the given pixel as follows:

$$a = x - \sigma\sqrt{q/(m-q)} \quad (1)$$

$$b = x + \sigma\sqrt{(m-q)/q} \quad (2)$$

where x is the mean of the pixel values in the block, σ is the standard deviation of the pixel values in the block, and q is the number of pixels in the light pixel group. The pixel values in the light pixel group are mapped to a, and the pixel values in the dark pixel group are mapped to b. Each block is encoded as (x, σ, B), where B is a binary vector of length m referred to as a mask (also called a bit plane or a bit map). The mask B indicates which pixel locations in a block are assigned to the light pixel group and which pixel locations are assigned to the dark pixel group. During decoding, the quantization levels a and b are computed from the values x and σ in the encoded data using equations (1) and (2), and every pixel in the decoded image is assigned one of the quantization levels in accordance with the mask B.

By representing each block of pixels by first and second moment values and a mask, the BTC method achieves a significant compression of the original image data. Additional compression of the image data may be achieved by encoding the BTC quantization data using, for example, run-length coding and variable length coding techniques.

SUMMARY

In one aspect, the invention features a machine-implemented encoding method. In accordance with this inventive method, an image is quantized by assigning sub-ranges of pixel values in the image to respective quantization levels. The quantized image is encoded based at least in part on a mask lookup table assigning index values to respective masks, wherein each mask corresponds to a respective spatial distribution of the quantization levels.

In another aspect, the invention features a machine-implemented decoding method. In accordance with this inventive method, a code corresponding to an encoded image with pixel values quantized to respective quantization levels is received. The code is decoded based at least in part on a mask lookup table assigning index values to respective masks, wherein each mask corresponds to a respective spatial distribution of the quantization levels.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The embodiments described in detail below may be incorporated into any image coding method that involves masks that describe the spatial distributions of values that are used to reconstruct images. When incorporated in block truncation coding (BTC) methods, for example, these embodiments enable image data to be additionally compressed beyond the levels achieved by traditional BTC mask data encoding approaches. In general, the compression improvements realized by the embodiments described herein increase with the non-uniformity of the distribution of the block masks in an image. Therefore, these improvements tend to vary with the re-scaling (or re-sampling) ratio and on the specific re-scaling algorithm that is applied to the image data. For example, the degree of improvement is larger for re-scaled images than for un-scaled (original resolution) images because a re-scaled image tends to have a more non-uniform distribution of block masks. The degree of improvement was found to be higher in cases in which pixel replication based re-scaling methods were used as compared to cases in which bi-linear re-scaling methods were used with the same re-scaling ratio.

Figure 1:
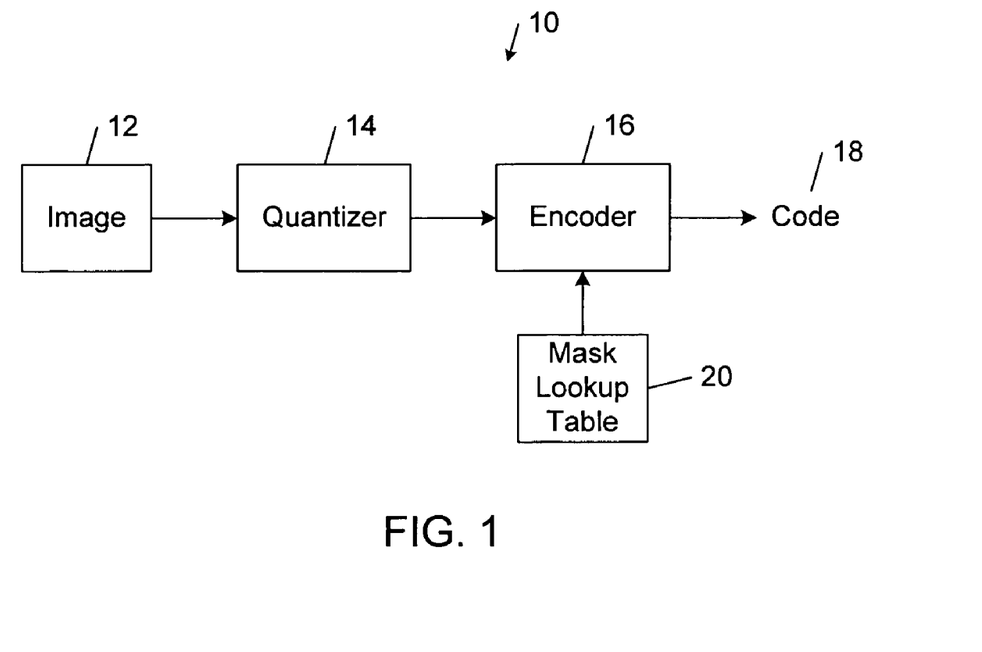
FIG. 1 is a block diagram of an embodiment of an image encoding system.

FIG. 1 shows an embodiment of a system 10 for encoding an image 12.

The image encoding system 10 includes a quantizer 14 and an encoder 16. The quantizer 14 receives the image 12 and quantizes the values of pixels in the image 12 to respective quantization levels. The encoder 16 receives the quantized image generated by the quantizer 14 and encodes the quantized image into a code 18 based at least in part on a mask lookup table 20. As explained in detail below, the mask lookup table 20 assigns index values to respective masks. Each of the masks corresponds to a respective spatial distribution of the quantization levels. By judicious selection of a relatively small subset of all the possible masks to include in the mask lookup table 20, the image encoding system 10 is operable to compress image 12 by a significant amount.

The image 12 may correspond to a complete original image or only a portion (e.g., a block) of an original image. The original image may correspond to any type of image, including an image that was captured by an image sensor (e.g., a video camera, a still image, or an optical scanner) or a processed (e.g., filtered, reformatted, enhanced or otherwise modified) version of such an original image. The image 12 also may correspond to a complete or partial version of one of multiple color layers used to represent an original image.

In general, the image encoding system 10 is not limited to any particular hardware or software configuration, but rather it may be implemented in any computing or processing environment, including in digital electronic circuitry or in computer hardware, firmware, device driver, or software. In some implementations, the image encoding system 10 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

Figure 2:
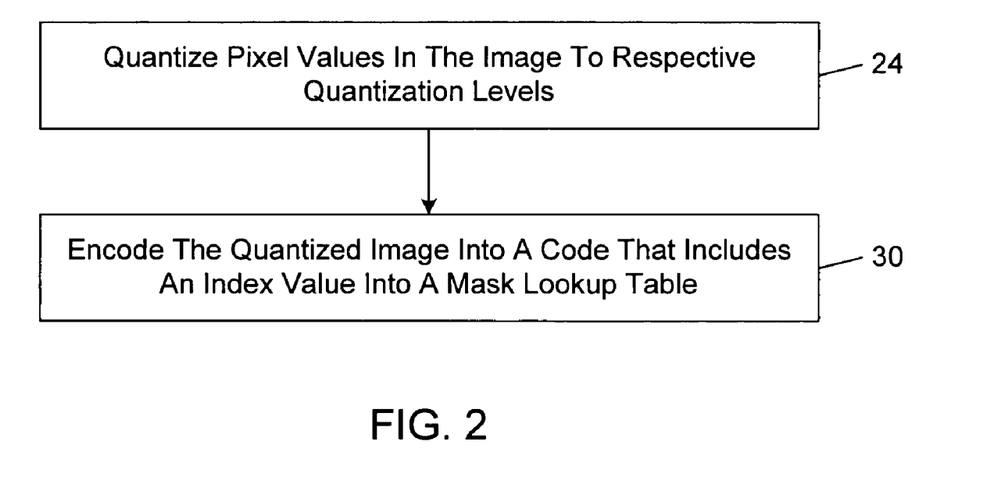
FIG. 2 is a flow diagram of an embodiment of a method of encoding an image.
Figure 3:
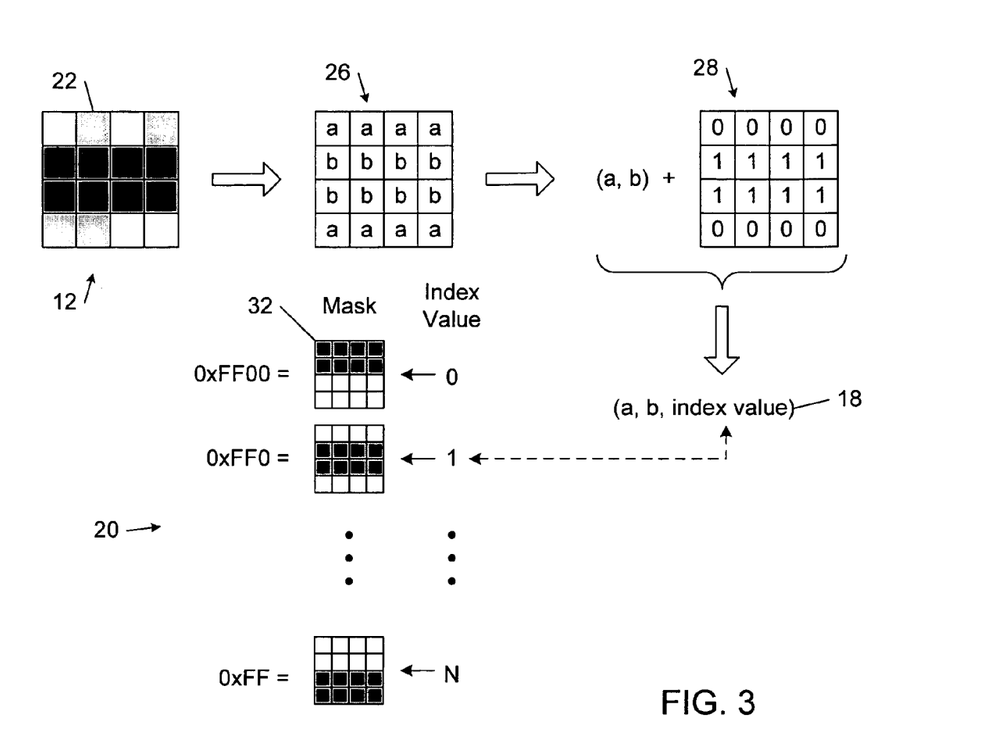
FIG. 3 is a diagrammatic view of an exemplary data pipeline for the image encoding method of FIG. 2.

Referring to FIGS. 2 and 3, in one embodiment, the image encoding system 10 encodes the image 12 into the code 18 as follows. The quantizer 14 quantizes image 12 by assigning sub-ranges of the values of pixels 22 of the image 12 to respective quantization levels a, b based on a specified mask definition (block 24). In one implementation, the quantization values a, b are computed using equations (1) and (2) above. In another implementation, the first quantization level, a, is the mean of all pixel values smaller than the mean of the pixel values of image 12, and the second quantization level, b, is the mean of all pixel values greater than or equal to the pixel value mean. The quantized image generated by the quantizer 14 is represented graphically by a quantization map 26. The quantized image also may be represented by the combination of the quantization levels (a, b) and a target mask 28, where 0's in the target mask 28 designate pixel locations assigned the quantization level a, and 1's in the target mask 28 designate pixel locations assigned the quantization level b.

The encoder 16 encodes the quantized image that is generated by the quantizer 14 into code 18, which includes an "index value" into the mask lookup table 20 (block 30). The mask lookup table 20 includes a set of index values (e.g., 0, 1, . . . , N), each of which is associated with a respective mask 32. The encoder 16 compares the target mask 28 with each of the masks 32 that are indexed in the mask lookup table 20. If a matching mask 32 is identified, the encoder 16 encodes the target mask 28 with the index value in the mask lookup table corresponding to the matching mask 32.

In some implementations, the target mask 28 and each of the indexed masks 32 are represented by a respective code value (e.g., a hexadecimal code or a binary code). In these embodiments, the matching process that is performed by the encoder 16 involves comparing the code value of the target mask 28 with each of the mask code values that are indexed in the mask lookup table 20. For example, the exemplary target mask 28 shown in FIG. 3 corresponds to the 16-bit binary word "0000111111110000", which is equivalent to the hexadecimal value 0x0FF0. With respect to this example, the encoder 16 compares the hexadecimal value 0x0FF0 to each of the mask code values in mask lookup table 20, until the matching mask code value 0x0FF0 corresponding to index value 1 is identified.

As mentioned above, by judicious selection of a relatively small subset of all the possible masks to include in the mask lookup table, the image encoding system 10 is operable to compress image 12 by a significant amount. For example, the exemplary image 12 shown in FIG. 3 consists of a 4×4 array of sixteen pixels. Accordingly, there are $2^{16}$ (i.e., 65,536) possible target masks 28 that could be generated, requiring sixteen bits to encode. In one exemplary implementation, the mask lookup table contains $2^7-1$ (i.e., one hundred twenty-seven) masks 32. In this implementation, a 1-bit mask flag is reserved to signal whether the mask is given by an index into the mask lookup table 20 (mask flag is on) or by another representation (mask flag is off). With respect to this implementation, an image 12 whose target mask 28 is indexed in the mask lookup table 20 is encoded by the mask flag and its index in the mask lookup table 20. Accordingly, in the implementation, only eight bits are needed to encode the target mask 28, instead of sixteen bits. In addition, in accordance with this implementation the encoding is lossless because the index value links to a complete specification of the target mask 28.

When the target mask 28 is not indexed in the mask lookup table 20, the encoder 16 is configured to encode the target mask 28 using another representation. For example, as described in the context of the image encoding system 40 shown in FIG. 5, the encoder 16 may be configured to encode the target 28 using either a lossy representation or a lossless representation.

Any number of techniques may be used to construct the mask lookup table 20. In general, the mask lookup table 20 may be static (i.e., the mask lookup table 20 does not change with each image 12) or adaptive (i.e., a corresponding mask lookup table 20 is generated for each image 12).

The subset of all possible masks that are indexed in a static mask lookup table may be selected in a variety of different ways. In one approach, the indexed masks are selected based on an analysis of the masks appearing in a large dataset of images, where the most frequent masks in the dataset are indexed in the static mask lookup table. In some implementations, a static mask lookup table 20 is not transmitted with each quantized image file and, instead, a static mask lookup table is hard-coded into both the encoder 16 and the corresponding decoder.

Similarly, the subset of all possible masks that are indexed in an adaptive mask lookup table may be selected in a variety of different ways. In one adaptive approach, the indexed masks are selected based on an analysis of the masks appearing in each image, where the most frequent masks in the image are indexed in the adaptive mask lookup table. This approach processes an image in two passes. During the first pass, the mask statistics are gathered and the adaptive mask lookup table is defined. During the second pass, the adaptive mask lookup table is used to compress the mask data in the image. In another adaptive approach, an adaptive mask lookup table is constructed in a single pass. In this approach, the adaptive mask lookup table changes during the encoding process in accordance with one or more predefined rules. For example, the mask lookup table may contain a subset of the most recent masks or a subset of the most frequent masks at any time. An explicit mask is transmitted before referring to the mask by an index into an adaptively generated mask. At the decoding stage, an adaptive mask table is reconstructed using the same predefined rules that are used by the encoder 16 and the explicit masks in the data received from the encoder 16.

Figure 4:
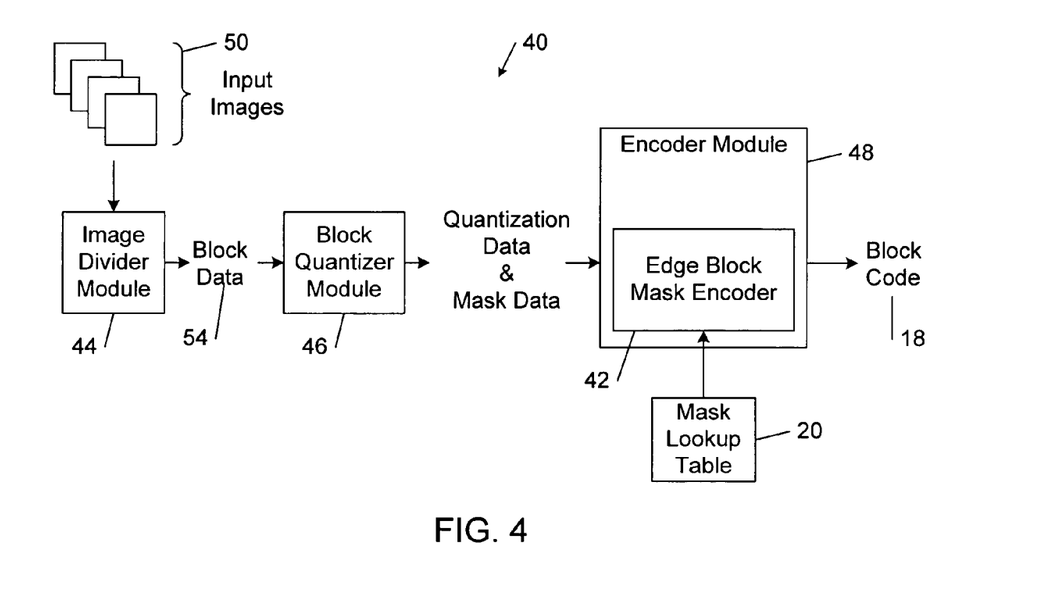
FIG. 4 is a block diagram of an embodiment of an image encoding system that incorporates the image encoding system of FIG. 1.
Figure 5:
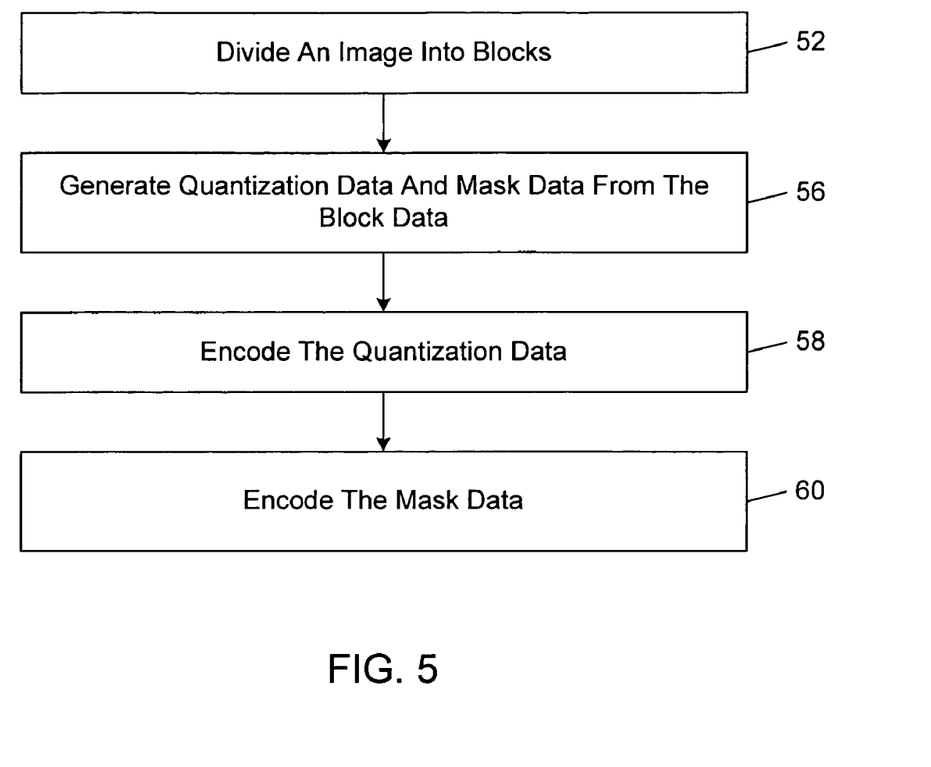
FIG. 5 is a flow diagram of an embodiment of a method of encoding an image.

FIG. 4 shows an embodiment of an image encoding system 40 that includes an image divider module 44, a block quantizer 46 that corresponds to an implementation of quantizer 14, and an encoder module 48 that includes an implementation of encoder 16 in the form of an edge block mask encoder 42. In some implementations, the image encoding system 40 is incorporated into a high-speed, commercial printer such as the INDIGO® digital press, which is available from Hewlett-Packard Company of Palo Alto, Calif. USA. FIG. 5 shows an embodiment of a method by which image encoding system 10 encodes input images 50.

The image divider module 44 divides each input image 50 into a set of blocks of pixels (e.g., 4×4 pixel blocks) (block 52). In some implementations, each input image 50 corresponds to a respective color separation of an original image. For example, in one exemplary implementation, an original image is represented in the CMYK color space by four separate color separations. Each of the four color separations CMYK is compressed separately by the image encoding system 40 as a gray-scale image.

The block data 54 that is generated by the image divider module 44 is transmitted to the block quantizer module 46. The block quantizer module 46 generates quantization data and mask data from the block data (block 56). In particular, the block quantizer module 46 defines the quantization thresholds and the quantization levels for each image block. In some implementations, either one or two colors represent an image block. A single-color block is referred to as a contone (continuous tone) block. A block of two colors is referred to as an edge block.

In some implementations, the encoder module 48 encodes the mask data as follows (block 60). With respect to contone blocks, the encoder module 48 does not transmit the mask data; instead, the encoder module 48 only transmits the encoded quantization data. The edge block mask encoder 42 uses the mask lookup table 20 to efficiently encode the masks of edge blocks, in accordance with the process described above in connection with the image encoding system 10 shown in FIG. 1.

Figure 6:
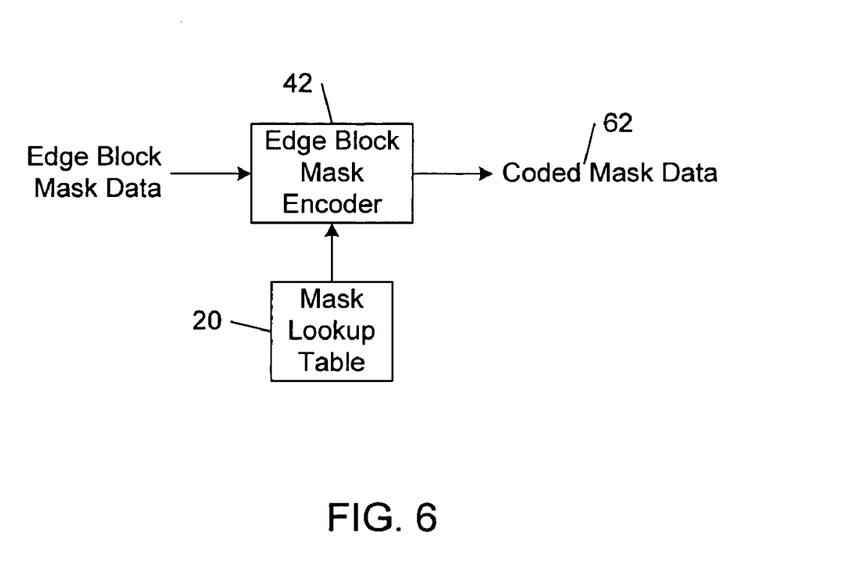
FIG. 6 is a block diagram of an embodiment of an encoder module in the image encoding system of FIG. 4.
Figure 7A:
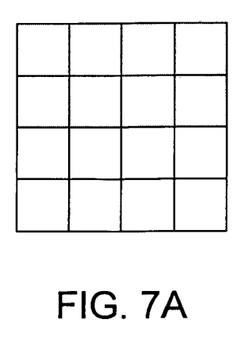
FIGS. 7A-7L are block diagrams of exemplary masks indexed in a mask lookup table.
Figure 7B:
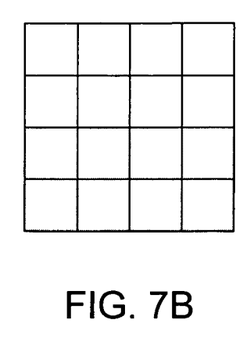
Figure 7C:
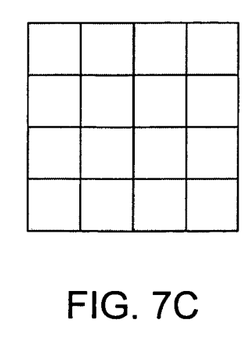
Figure 7D:
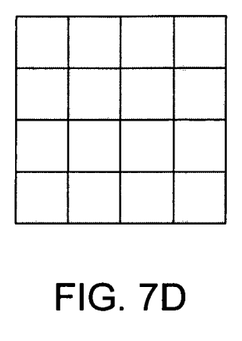
Figure 7E:
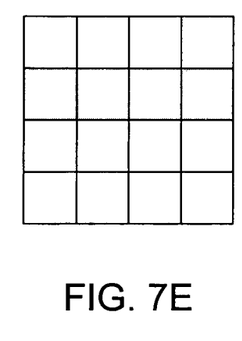
Figure 7F:
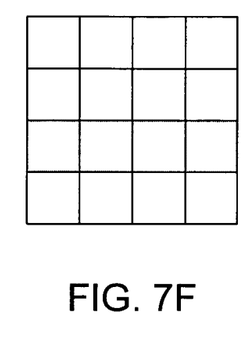
Figure 7G:
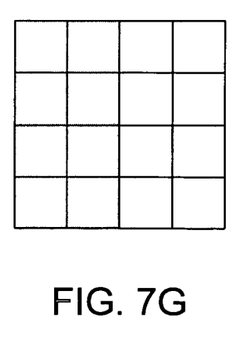
Figure 7H:
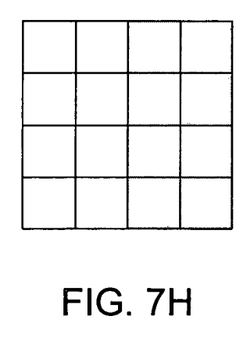
Figure 7I:
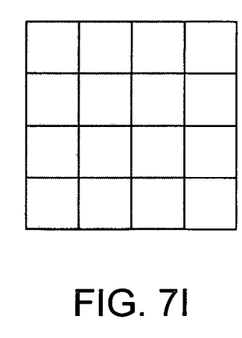
Figure 7J:
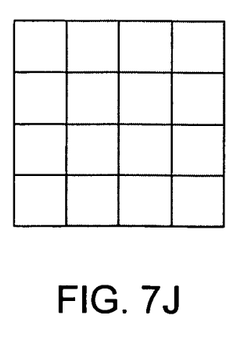
Figure 7K:
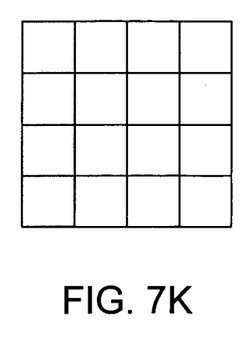
Figure 7L:
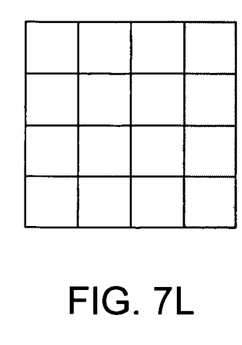

Referring to FIG. 6, in some exemplary implementations, the edge block mask encoder 42 generates coded mask data 62 from the edge block mask data received from the block quantizer module 46. For edge blocks whose mask is in the mask lookup table 20, the coded mask data 62 corresponds to the index value of the mask in the mask lookup table 20. The coded mask data 62 also includes a 1-bit mask flag that is reserved to signal to the decoder whether the mask is given by an index into the mask lookup table (mask flag is on) or by another representation (mask flag is off), as described in detail below. In implementations in which the mask lookup table 20 includes only one hundred twenty-seven masks, only eight bits are needed to encode a mask that appears in the mask lookup table 20. Masks appearing in the mask lookup table 20 are encoded losslessly. The encoding algorithm attempts to find every edge mask in the mask lookup table 20. In some implementations, the masks in the mask lookup table 20 are sorted to increase the efficiency of this searching operation.

In some exemplary cases, the edge block mask encoder 42 encodes edge blocks with masks that are not in the mask lookup table 20 using a lossy encoding method. In one of these implementations, the mask flag takes the place of a predefined bit in the mask. A mask that is not in the mask lookup table 20 is therefore encoded by a zero mask flag followed by a "punctured" mask of fifteen bits. During decoding, the missing bit may be always set to 1, in which case the original mask is reconstructed correctly in roughly half of the cases. By using more judicious heuristics for reconstructing the mask flag bit, such as majority vote of neighbors, the incidence of incorrect reconstruction of the original mask may be additionally reduced.

In other exemplary cases, the edge block mask encoder 42 encodes edge blocks with masks that are not in the mask lookup table 20 using a lossless encoding method. In one of these implementations, a three-byte mask code is used. In these cases, the leading byte holds the hexadecimal value 0xFF and the remaining two bytes hold an explicit definition of the mask. In some implementations, the three byte mask is used only in those cases in which the rule used by the decoder for reconstructing the punctured mask produces the wrong bit.

To summarize, in some exemplary implementations, three different codes are used for the mask data: a one-byte code for a mask in the mask lookup table 20; a two byte code for a punctured explicit mask definition; and a three-byte code for a full explicit mask definition. In one implementation, this encoding scheme is specified as follows:

If the edge color is followed by a '1' plus a 7-bit number, inx, in the region 0x00-0x7E, then inx is an index to the mask Look-Up Table 5.

If the edge color is followed by a '0', then the next 15 bits define an edge mask for all the block pixels excluding one pixel at some pre-defined position. This mask code is 1-bit lossy. The missing pixel may be computed out of the other pixels in the block using some heuristic algorithm.

If the edge color is followed by the code 0xFF, then the next two bytes comprise an explicit mask description for the edge block.

With respect to these exemplary implementations, decoding is performed in accordance with the first byte of the edge mask code. If the first byte represents the hexadecimal value 0xFF, then an explicit mask definition follows. If the first byte represents a number in the range 0x80-0xFE, then its seven least significant bits form an index into the mask lookup table 20. Otherwise, the leading bit is zero and the fifteen trailing bits define a punctured mask.

It is noted that the exemplary implementations described above represent only a subset of the possible implementations of system 10. For example, the mask lookup table may be of any size. In addition, the index code and the explicit mask code may be distinguished using any method, including a method that is not based on a one-bit mask flag. Also, in other approaches, the leading byte of a lossless encoding of an explicit mask definition may hold a value that is different than 0xFF.

In one analysis of a dataset of images consisting of all separation files for a set of images to be printed, it was discovered that there is a non-uniform distribution of masks appearing in the dataset. In this analysis, the one hundred twenty-seven masks that occurred most frequently over all separation files in the dataset were selected and indexed in a mask lookup table. The hexadecimal codes for the most common masks are shown in TABLE 1 below, ordered from most common on the upper left to less common.

TABLE 1

| FF00 | F0FF | 00FF | 7777 | FF0F | 0F00 | 00F0 | CCCC |
|------|------|------|------|------|------|------|------|
| 3333 | EEEE | 8888 | 1111 | 1F11 | 8F88 | 88F8 | 11F1 |

TABLE 1-continued

| | | | | | | | |
|---|---|---|---|---|---|---|---|
| E0EE | 7077 | 7707 | EE0E | 0FF0 | 3F33 | FF11 | CFCC |
| 88FF | CCFC | 11FF | FF88 | 33F3 | F00F | C0CC | 7700 |
| 00EE | 3033 | 3303 | 0077 | EE00 | CC0C | FF33 | CCFF |
| 33FF | FFCC | 3300 | 00CC | 0033 | CC00 | 7F77 | F8FF |
| F1FF | FF1F | EFEE | EEFE | 77F7 | FF8F | 88EE | 3F03 |
| 7711 | C0FC | EE88 | CF0C | 1177 | 30F3 | 0700 | 33CC |
| CC33 | 0070 | 8088 | 0E00 | 00E0 | 1011 | 1101 | FF3F |
| F3FF | FCFF | FF77 | 77FF | EEFF | 8808 | FFEE | FFCF |
| 3C33 | 7F07 | C3CC | E8EE | EE11 | 11EE | 8877 | 7788 |
| E0FE | CC3C | 33C3 | EF0E | 7717 | 7177 | 70F7 | EE8E |
| 1F01 | 1711 | 80F8 | 8F08 | 8E88 | 88E8 | 10F1 | 1171 |
| 9999 | 1E11 | 8788 | E1EE | 7877 | 11E1 | 8878 | 11E1 |
| 7787 | 6666 | 0300 | 1100 | 00C0 | 0030 | 0011 | 0C00 |
| 0088 | 8800 | FF7F | F7FF | FEFF | FFEF | 1FF1 | |

FIGS. 7A-7L graphically illustrates a selected subset of the masks contained in TABLE 1.

A mask lookup table containing the masks listed in TABLE 1 was constructed. For each file in the dataset, the mask table hits (i.e., the number of edge blocks with a mask that appears in the mask lookup table) were counted. The proportion of such edge blocks out of the whole edge block set in a file is referred to as the mask table hit rate of the file. With respect to the analyzed dataset, the mask table hit rate of every separation file was at least 80%, and the average hit rate in the static mask lookup table was 95%. Most of the files had hit rates above 90%. The worst compressed separation file had a mask hit rate of 93%.

Based on these results it is clear that the embodiments described herein enable a significant improvement in the image compression ratio that can be achieved, especially with respect to images with high edge content.

An investigation of how the mask hit rate changes in various printing scenarios of the image dataset was performed. TABLE 2 summarizes the results. In the first printing scenario (1), the image data is re-scaled from 250 dpi to 812 dpi. In the second printing scenario (2), the image data is re-scaled from 350 dpi to 812 dpi. In the third printing scenario (3), the image data is re-scaled from 600 dpi to 812 dpi. In the fourth printing scenario (4), the image data is bi-linearly re-sampled from 350 dpi to 812 dpi.

TABLE 2

| Printing Scenario | Static Mask Lookup Table Hit Rate | Two-Pass Adaptive Mask Lookup Table Hit Rate |
|---|---|---|
| 1: 250 dpi → 812 dpi | 100% | 100% |
| 2: 350 dpi → 812 dpi | 91% | 95% |
| 3: 600 dpi → 812 dpi | 44% | 62% |
| 4: Bi-Linear (350 dpi → 812 dpi) | 36% | 84% |

The results presented in TABLE 2 show that the static mask lookup table corresponding to TABLE 1 works well and generalizes to new data as shown in the first two rows of TABLE 2. The mask hit rate for mask lookup table, however, depends on the scaling method. The high hit rate that was achieved using the two-pass adaptive mask lookup tables for the bi-linear re-sampled data may indicate that a static mask lookup table that is tailored for this data may work well. For very high resolution data, the mask lookup tables offer less significant compression improvements.

Figure 8:
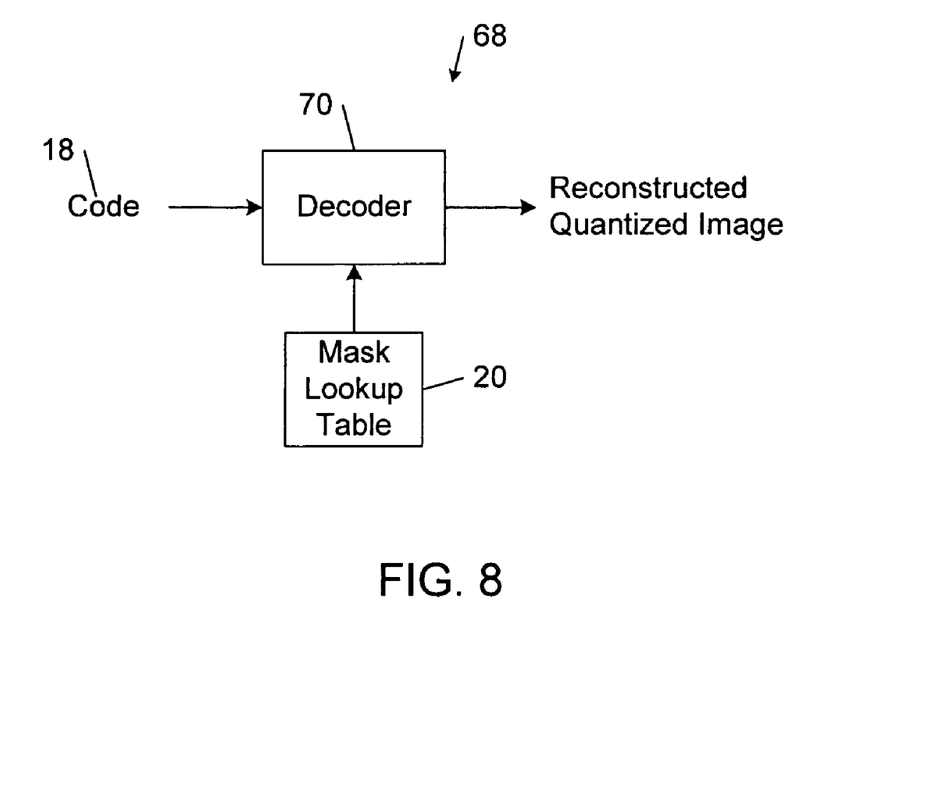
FIG. 8 is a block diagram of an embodiment of a decoder for decoding encoded image data.

FIG. 8 shows an embodiment of a decoding system 68 that is configured to decode the quantized image data that is generated by the image encoding systems described above. The decoding system 68 includes a decoder 70 and a mask lookup table 20. As explained above, the mask lookup table 20 may be a static table or an adaptive table that is generated by the decoding system 68. In general, the decoding system 68 is not limited to any particular hardware or software configuration, but rather it may be implemented in any computing or processing environment, including in digital electronic circuitry or in computer hardware, firmware, device driver, or software. In some implementations, the decoding system 68 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

Figure 9:
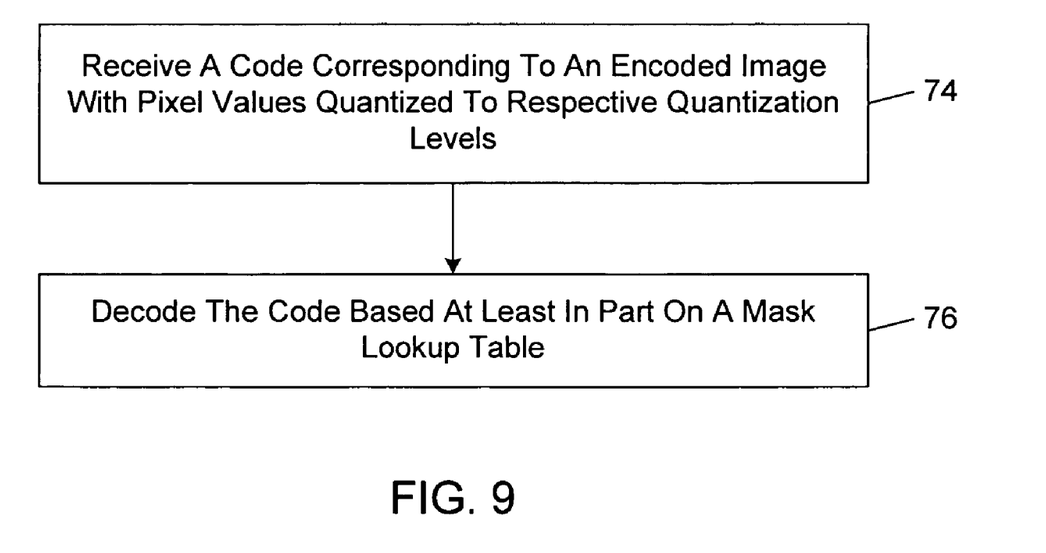
FIG. 9 is a flow diagram of an embodiment of a method of decoding encoded image data.

FIG. 9 shows an embodiment of a method by which decoder 70 decodes the encoded quantized image data. In accordance with this method, decoder 70 receives a code 18 corresponding to an encoded image with pixel values quantized to respective quantization levels (block 74). In some implementations, the decoder 70 also receives encoded mask data along with the code 18. The decoder 70 decodes the code 18 based at least in part on the mask lookup table 20 (block 76). As explained above, the mask lookup table 20 assigns index values to a subset of all possible masks that could describe the spatial distribution of quantization levels making up the quantized image.

The decoder 70 parses the code 18 for an index value corresponding to a mask in the mask lookup table 20. If an index value is identified, the decoder 70 reconstructs the quantized image based on the quantization levels contained in the code 18 and a mask obtained from the mask lookup table based on the index value contained in the code 18. If a mask lookup table index value is not identified, the decoder parses the code 18 for a mask code that explicitly defines the spatial distribution of quantization levels in the quantized image. As explained above, the mask code may specify the distribution of quantization levels using a lossless code or in a lossy code. The decoder 70 reconstructs the quantized image based on the quantization levels contained in the code 18 and the explicit mask definition contained in the code 18.

Other embodiments are within the scope of the claims.

In general, the systems may be implemented, in part, in a computer process product tangibly embodied in a machine-readable storage device for execution by a computer processor. In some embodiments, these systems are implemented in a high level procedural or object oriented processing language. In other embodiments, these systems are implemented in assembly or machine language. The processing language may be a compiled or interpreted language. The methods described herein may be performed by a computer processor executing instructions organized, for example, into process modules that carry out these methods by operating on input data and generating output. Suitable processors include, for example, both general and special purpose microprocessors. Storage devices that are suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A machine-implemented encoding method, comprising:
operating a processor to perform operation comprising:
quantizing an image by assigning sub-ranges of pixel values in the image to respective quantization levels and determining a target spatial distribution of the quantization levels in the quantized image;
accessing a mask lookup table indexing masks with respective index values, wherein each of the indexed masks represents a respective spatial distribution of the quantization levels and all of the masks that are indexed by the mask lookup table collectively represent less than all possible spatial distributions of the quantization levels in the image; and
encoding the quantized image with a code comprising a selected one of the index values in the mask lookup table only in response to a determination that the mask indexed by the selected index value exactly matches the target spatial distribution of the quantization levels.

2. The method of claim 1, further comprising dividing the image into blocks of pixels and quantizing pixel values in each block to the quantization levels.

3. The method of claim 1, wherein quantizing the image comprises determining a quantization threshold.

4. The method of claim 3, wherein the quantization threshold is a mean of the pixel values.

5. The method of claim 3, wherein quantizing the image comprises determining first and second quantization levels based on the quantization threshold.

6. The method of claim 5, wherein quantizing the image comprises segmenting the pixels into first and second groups based on the quantization threshold, and the first and second quantization levels are means of the values of pixels in the first and second groups, respectively.

7. The method of claim 1, wherein quantizing the image comprises determining a first quantization level, a second quantization level, and a target mask corresponding to the target spatial distribution of the first and second quantization levels representing the pixel values in the quantized image.

8. The method of claim 7, wherein the encoding comprises comparing the target mask to one or more of the masks that are indexed in the mask lookup table.

9. The method of claim 8, wherein, the encoding comprises determining whether any of the indexed masks exactly matches the target mask.

10. The method of claim 8, wherein, in response to determination that none of the indexed masks exactly matches the target mask, encoding the quantized image with a code that includes a mask code that directly encodes the spatial distribution of quantization levels in the quantized image.

11. The method of claim 10, wherein the mask code corresponds to a lossy encoding of the spatial distribution of quantization levels in the quantized image.

12. The method of claim 10, wherein the mask code corresponds to a lossless encoding of the spatial distribution of quantization levels in the quantized image.

13. The method of claim 1, wherein the mask lookup table is static.

14. The method of claim 13, further comprising generating the mask lookup table based on a statistical analysis of a plurality of images, wherein the generating comprises indexing in the mask lookup table only masks representing a selected set of most frequently occurring spatial distributions of the quantized levels in the plurality of images, the selected set representing less than all spatial distributions of the quantization levels in the plurality of images.

15. The method of claim 13, further comprising generating multiple mask lookup tables based on respective sets of image data, storing the generated mask lookup tables, and based on an analysis of the image selecting only one of the stored mask lookup tables to use as the mask lookup table for encoding the image.

16. The method of claim 1, further comprising generating the mask lookup table based on pixel values in the image.

17. The method of claim 16, wherein generating the mask lookup table comprises: dividing the image into blocks, quantizing the image blocks; identifying a set of masks respectively corresponding to the quantized image blocks; selecting a subset of the masks; and indexing the subset of the masks in the mask lookup table.

18. The method of claim 17, wherein the subset of the masks in the mask lookup table is selected based on frequency of mask correspondence with the quantized image blocks during a first pass through data of the image, and the quantized image is encoded based at least on part on the generated mask lookup table during a second pass through the image data.

19. The method of claim 17, wherein the subset of the masks is selected adaptively based on statistics computed during processing of the quantized image blocks in a single pass through data of the image.

20. The method of claim 1, further comprising transmitting the encoded quantized image to a decoder.

21. The method of claim 20, further comprising transmitting the mask lookup table to the decoder.

22. The method of claim 1, further comprising storing the encoded quantized image in a machine-readable medium.

23. An encoding system, comprising:
a quantizer configured to quantize an image by assigning sub-ranges of pixel values in the image to respective quantization levels and determining a target spatial distribution of the quantization levels in the quantized image; and
an encoder configured to
access a mask lookup table indexing masks with respective index values, wherein each of the indexed masks represents a respective spatial distribution of the quantization levels and all of the masks that are indexed by the mask lookup table collectively represent less than all possible spatial distributions of the quantization levels in the image, and
encode the quantized image with a code comprising a selected one of the index values in the mask lookup table only in response to a determination that the mask indexed by the selected index value exactly matches the target spatial distribution of the quantization levels.

24. The system of claim 23, wherein the quantizer is operable to divide the image into blocks of pixels and quantize pixel values in each block to the quantization levels.

25. The system of claim 23, wherein quantizer is configured to segment the pixels into first and second groups based on a quantization threshold.

26. The system of claim 23, wherein the quantizer is operable to determine a first quantization level, a second quantization level, and a target mask corresponding to the target spatial distribution of the first and second quantization levels representing the pixel values in the quantized image.

27. The system of claim 26, wherein the encoder is configured to match the target mask to one of the masks indexed in the mask lookup table.

28. The system of claim 27, wherein, the encoder is operable to determine whether any of the indexed masks exactly matches the target mask.

29. The system of claim 27, wherein, in response to determination that none of the indexed masks exactly matches the target mask, the encoder encodes the quantized image with a code that includes a mask code that directly encodes the spatial distribution of quantization levels in the quantized image.

30. The system of claim 29, wherein the mask code corresponds to a lossy encoding of the spatial distribution of quantization levels in the quantized image.

31. The system of claim 30, wherein the mask code includes a lossy mask specification and a mask flag indicating that the mask is defined by the lossy mask specification in the mask code.

32. The system of claim 29, wherein the mask code corresponds to a lossless encoding of the spatial distribution of quantization levels in the quantized image.

33. The system of claim 23, wherein:
the encoding system generates the mask lookup table by dividing the image into blocks, quantizing the image blocks, identifying a set of masks respectively corresponding to the quantized image blocks, selecting a subset of the masks based on frequency of mask correspondence with the quantized image blocks during a first pass through data of the image, and indexing the subset of the masks in the mask lookup table; and
the encoder encodes the quantized image based at least on part on the generated mask lookup table during a second pass through the image data.

34. A machine-readable medium storing machine-readable instructions for causing a machine to perform operations comprises:
quantizing an image by assigning sub-ranges of pixel values in the image to respective quantization levels and determining a target spatial distribution of the quantization levels in the quantized image:
accessing a mask lookup table indexing masks with respective index values, wherein each of the indexed masks represents a respective spatial distribution of the quantization levels and all of the masks that are indexed by the mask lookup table collectively represent less than all possible spatial distributions of the quantization levels in the image; and
encoding the quantized image with a code comprising a selected one of the index values in the mask lookup table only in response to a determination that the mask indexed by the selected index value exactly matches the target spatial distribution of the quantization levels.

35. A machine-implemented decoding method, comprising:
operating a processor to perform operation comprising:
receiving a code encoding a quantized image that has pixel values quantized to respective quantization levels; and
decoding the code based at least in part on a mask lookup table assigning index values to respective masks, each mask representing a respective spatial distribution of the quantization levels, wherein the decoding comprises parsing the code for a target index value corresponding to one of the index values respectively assigned to the masks in the mask lookup table and, in response to a failure to identify the target index value, parsing the code for a mask code that directly encodes the spatial distribution of quantization levels in the quantized image.

36. The method of claim 35, further comprising reconstructing the quantized image based on the quantization levels and a mask corresponding to an index value in the code.

37. The method of claim 35, wherein the parsed mask code directly encodes a lossy specification of the spatial distribution of the quantization levels in the quantized image, and further comprising reconstructing the quantized image based on the lossy quantization level specification provided by the mask code.

38. The method of claim 35, wherein the mask lookup table is static.

39. The method of claim 35, further comprising receiving the mask lookup table.

40. The method of claim 35, further comprising generating the mask lookup table adaptively based on statistics computed during decoding.

41. The method of claim 40, wherein the mask lookup table is generated using an adaptive mask lookup table generation process that is used by an encoder to generate the encoded image.

42. A decoding system, comprising at least one data processing module programmed to perform operations comprising:
receiving a code encoding a quantized image that has pixel values quantized to respective quantization levels; and
decoding the code based at least in part on a mask lookup table assigning index values to respective masks, each mask representing a respective spatial distribution of the quantization levels, wherein in the decoding the at least one data processing module performs operations comprising parsing the code for a target index value corresponding to one of the index values respectively assigned to the masks in the mask lookup table and, in response to a failure to identify the target index value, parsing the code for a mask code that directly encodes the spatial distribution of quantization levels in the Quantized image.

43. The method of claim 11, wherein the mask code comprises a mask bit flag and a mask encoding bit string, the mask bit flag indicates that the target mask is given directly by the mask code instead of indirectly by an index into the mask lookup table, and the mask encoding bit string contains all by one of the bits needed to exactly encode the spatial distribution of the quantization levels in the quantized image.

44. The method of claim 12, wherein the mask code comprises a mask encoding bit string that contains all of the bits needed to exactly encode the spatial distribution of the quantization levels in the quantized image.

45. The system of claim 30, wherein the mask code comprises a mask bit flag and a mask encoding bit string, the mask bit flag indicates that the target mask is given directly by the mask code instead of indirectly by an index into the mask lookup table, and the mask encoding bit string contains all by one of the bits needed to exactly encode the spatial distribution of the quantization levels in the quantized image.

* * * * *

UNITED STATES PATENT AND TRADEMARK OFFICE
CERTIFICATE OF CORRECTION

| | |
|---|---|
| PATENT NO. | : 7,551,773 B2 |
| APPLICATION NO. | : 10/912034 |
| DATED | : June 23, 2009 |
| INVENTOR(S) | : Ruth Bergman et al. |

It is certified that error appears in the above-identified patent and that said Letters Patent is hereby corrected as shown below:

In column 9, line 47, in Claim 10, after "response to" insert -- a --.

In column 11, line 35, in Claim 34, delete "image:" and insert -- image; --, therefor.

In column 12, line 40, in Claim 42, delete "Quantized" and insert -- quantized --, therefor.

Signed and Sealed this

Nineteenth Day of January, 2010

David J. Kappos
*Director of the United States Patent and Trademark Office*